Patented June 1, 1926.

1,586,693

UNITED STATES PATENT OFFICE.

ADOLPHE H. NEY, OF NEW YORK, N. Y., ASSIGNOR TO THEODORE HAEBLER, OF NEW YORK, N. Y.

BLUE MONOAZO DYESTUFFS FOR WOOL OR SILK.

No Drawing.   Application filed November 13, 1924.  Serial No. 749,784.

It is well known that the amino diphenylamin mono-sulfonic acid of the following constitution

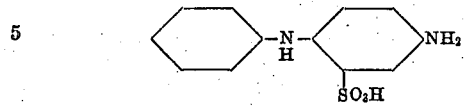

which can be easily and cheaply prepared by condensing, by means of acid binding media, the 1:nitro-4:chlor-benzol-3:sulfonic acid with aniline and reducing the resulting nitro-diphenylamin sulfonic acid, gives valuable blue-black to deep-black diazo dyestuffs of the general formula: amino-diphenylamin-sulfonic acid-azo-α-naphthylamin-azo-naphthol-sulfonic acid, or amino-diphenylamin-sulfonic acid-azo-α-naphthylamin-azo-naphthylamin-sulfonic acid, or amino-diphenylamin-sulfonic acid-azo-α-naphthylamin-azo-amino-naphthol-sulfonic acid. Such dyestuffs, known under the name of "Nerol" acid blacks, are commercial products and, owing to their desirable properties, are employed to a not inconsiderable extent, in spite of their somewhat higher price when compared with other acid blacks.

The homologue of the amino-diphenylamin-sulfonic acid, obtained in an analogous manner by employing ortho-toluidine instead of aniline and having the following constitution:

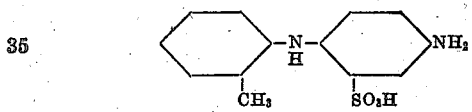

is also used for the production of black acid dyestuffs similar to those referred to above.

Monoazo dyestuffs containing this amino-dipenylamin-sulfonic acid as first or diazo component, and 1:7 amino-naphthol and its derivatives have also been suggested—see German Patent No. 198137. It would appear that such dyestuffs have not found commercial application and are, in fact, of unattractive shades and unsatisfactory properties.

I have found that the monoazo dyestuff, obtained by coupling, in alkaline solution, the diazo compound of amino-diphenylamin-monosulfonic acid, with the acetyl-compound of 1:8 amino-naphthol 3:6 disulfonic acid, commonly called H-acid, produces on wool or silk in an acid bath, brilliant and fast shades of blue of a reddish cast, that compare favorably with those produced by higher priced blue dyestuffs.

Example.—28.6 parts (by weight) of the sodium salt of p-amino-diphenylamin-monosulfonic acid are diazotized, by acidulating the solution, cooling the same to 5–10° C., and adding 7 parts sodium nitrite. After completed diazotization, the diazo solution is combined with a cold solution containing 38.3 parts acetyl 1:8 amino-naphthol 3:6 disulfonic acid (acetyl-H-acid) and sufficient soda to produce an alkaline reaction at the end. The solution is then agitated for several hours. The dyestuff, if necessary, is completely precipitated by the addition of salt, filtered and dried.

The dyestuff thus obtained is a dark blue powder, easily soluble in water with a reddish blue color and producing, when dyed from an acid bath, on wool or silk, brilliant blue shades of a reddish cast, which do not change in artificial light, and are very fast to light, washing, carbonizing, and fast to fulling, milling, and alkali.

By substituting, in the example given above, the amino-diphenylamin-sulfonic acid by its homologue, the amino-phenyl-tolyl-amin-sulfonic acid, referred to above, a dyestuff of similar properties but of a purplish blue shade is obtained. 1:amino-2':methoxy-diphenylamin-3:sulfonic acid, obtained by condensing p-nitrochlor-benzol-mono-sulfonic acid with ortho-anisidine, and reducing the resulting nitro-diphenylamin derivative, when diazotized and coupled with acetyl-H-acid gives a dyestuff of similar properties and very brilliant greenish blue shade.

Having described my invention, what I claim is this:

1. As a new product, the monoazodyestuff, obtained by coupling in an alkaline solution the diazo compound of 1:amino-diphenylamin-3:sulfonic acid with 1:acetyl-amino-8:hydroxy-naphthalene 3:6 sulfonic acid (acetyl-H-acid).

2. As a new product the monoazo dyestuff, obtained by coupling in an alkaline solution, diazotized 1:amino-2':methyl diphenylamin-3:sulfonic acid with 1:acetyl-amino-8:hydroxy-naphthalene-3:6 disulfonic acid, (acetyl-H-acid), said dyestuff dyeing wool and silk in bluish purple shades fast to light, washing, carbonization, and fulling.

3. Monoazo dyestuffs, having as first or diazo component a diphenylamin derivative containing a sulfonic acid group in ortho-position to the imido group and as second or azo component, acetyl-H-acid.

4. Azo-acid dyestuffs, dyeing wool and silk level, fast to light, washing, carbonizing, fulling, etc., and having as first component a diphenylamin derivative, derived from condensing p-nitro-chlor-benzol-sulfonic acid with a compound having aniline characteristics, the said compound having a position para to the amino group free, and reducing the nitro-diphenylamin sulfonic acid thus obtained, and as second or azo-component, acetyl-H-acid.

In testimony whereof I have hereunto set my hand.

ADOLPHE H. NEY.